US012746821B2

(12) United States Patent
Song et al.

(10) Patent No.: US 12,746,821 B2
(45) **Date of Patent: *Sep. 29, 2026**

(54) VEHICLE DISPLAY STRUCTURE FOR DISPLAYING LARGE SCREEN

(71) Applicant: LG ELECTRONICS INC., Seoul (KR)

(72) Inventors: Seunghwan Song, Seoul (KR); Hansoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/115,071

(22) PCT Filed: Oct. 25, 2022

(86) PCT No.: PCT/KR2022/016373

§ 371 (c)(1),
(2) Date: Mar. 25, 2025

(87) PCT Pub. No.: WO2024/090598

PCT Pub. Date: May 2, 2024

(65) Prior Publication Data

US 2026/0103078 A1 Apr. 16, 2026

(51) Int. Cl.
*B60K 35/22* (2024.01)
*B60K 35/231* (2024.01)

(52) U.S. Cl.
CPC ............ *B60K 35/22* (2024.01); *B60K 35/231* (2024.01); *B60K 2360/182* (2024.01); *B60K 2360/184* (2024.01); *B60K 2360/23* (2024.01); *B60K 2360/27* (2024.01); *B60K 2360/31* (2024.01); *B60K 2360/66* (2024.01)

(58) Field of Classification Search
CPC ............................ B60K 35/22; G02B 27/0101
USPC .............................................................. 345/7
See application file for complete search history.

(56) References Cited

U.S. PATENT DOCUMENTS

| | | | |
|---|---|---|---|
| 2005/0040940 | A1 | 2/2005 | Sonobe |
| 2021/0099662 | A1 | 4/2021 | Arakawa |

FOREIGN PATENT DOCUMENTS

| | | | |
|---|---|---|---|
| JP | 2010-134396 | A | 6/2010 |
| JP | 2015-54597 | A | 3/2015 |
| JP | 2016-176918 | A | 10/2016 |
| JP | 2016-177084 | A | 10/2016 |
| JP | 2018-17834 | A | 2/2018 |

(Continued)

*Primary Examiner* — Duane N Taylor, Jr.
(74) *Attorney, Agent, or Firm* — Birch, Stewart, Kolasch & Birch, LLP

(57) ABSTRACT

A display device including a first display outputting first light forming first visual information, a second display outputting second light forming second visual information, and a semi-transparent mirror having a front surface reflecting the first light and a rear surface transmitting the second light. A first edge area of reflected light reflected by the semi-transparent mirror and a second edge area of transmitted light transmitted by the semi-transparent mirror overlap each other to form an overlapping area, so that the non-overlapping area of the reflected light and the non-overlapping area of the transmitted light are synthesized into one area through the overlapping area to create one display area that is seamlessly connected in one direction.

15 Claims, 8 Drawing Sheets

(56) References Cited

FOREIGN PATENT DOCUMENTS

| | | | | |
|---|---|---|---|---|
| JP | 2021189302 | A | * | 12/2021 |
| KR | 10-2002-0059753 | A | | 7/2002 |

* cited by examiner (a)

(b)

(a)

(b)

(a)

(b)

VEHICLE DISPLAY STRUCTURE FOR DISPLAYING LARGE SCREEN

CROSS REFERENCE TO RELATED APPLICATIONS

This application is the National Phase of PCT International Application No. PCT/KR2022/016373, filed on Oct. 25, 2022, all of which is hereby expressly incorporated by reference into the present application.

TECHNICAL FIELD

The present disclosure relates to a vehicle display that displays various information related to a vehicle, and more particularly, to a display structure including a plurality of displays to display a large screen.

BACKGROUND ART

Conventionally, in the case of a driver seat of a vehicle, that is, a cockpit, a windshield glass required to allow a driver to look ahead is disposed, and a space must be secured for the driver's movement around the driver seat of the vehicle to allow the driver to operate the vehicle such as a steering wheel or pedals. Therefore, unlike conventional displays with a standard ratio (e.g., 4:3 or 16:9), vehicle displays have the form of a strip-shaped display that extends long in a horizontal direction, and due to the characteristics of such vehicle displays, there is a problem in that it is extremely difficult to produce a large-screen display above a predetermined size.

However, unlike conventional technologies that only provide various gauge information related to the vehicle, current vehicle control technology can provide various information such as navigation information, augmented reality (AR), and mixed reality (MR) to a driver or passenger. Accordingly, there have been growing social needs to provide more visual information to a driver or passenger, and as a solution to such social needs, a larger, integrated display (e.g., pillar-to-pillar (P2P) display) that can display content across an entire width of the cockpit is required.

However, as described above, since it is very difficult to produce a large-screen display above a predetermined size for vehicle displays, as an alternative, a method of connecting a plurality of vehicle displays (e.g., displays having a resolution of 1920×550) in one direction has emerged. However, each display panel includes a bezel area, that is, a border area where no screen is displayed, due to its structural design, and thus the bezel area causes an area where no image is displayed between the displays connected to one another. Furthermore, a screen area corresponding to each display is divided due to those bezel areas, and thus there is a problem in that it is difficult to implement an integrated display area with a single large screen.

DISCLOSURE OF INVENTION

Technical Problem

The present disclosure aims to solve the foregoing problems and other problems, and an aspect of the present disclosure is to provide a display structure capable of implementing a single interconnected integrated display area with a large screen by connecting a plurality of displays without bezel areas.

Solution to Problem

In order to achieve the foregoing and other objectives, according to an aspect of the present disclosure, a display structure according to an embodiment of the present disclosure may include a semi-transmissive mirror having a front surface that reflects incident light to form a virtual image corresponding to the incident light, and a rear surface that transmits the incident light to form a real image corresponding to the incident light, a plurality of displays disposed to cross alternately at front and rear surface sides of the semi-transmissive mirror with the semi-transmissive mirror at the center, and a housing accommodating the semi-transmissive mirror and the plurality of displays, and having an opening surface that faces the semi-transmissive mirror from a driver's eye height on one surface thereof, wherein among the plurality of displays, at least one first display disposed at a front surface side of the semi-transmissive mirror to output an image reflected on a front surface of the semi-transmissive mirror is disposed at an upper or lower side of an opening direction of the opening surface, and among the plurality of displays, at least one second display disposed on a rear surface side of the semi-transmissive mirror to output an image transmitted through a rear surface of the semi-transmissive mirror is disposed to face the opening direction, and the semi-transmissive mirror is disposed to be inclined at a predetermined angle in a direction in which the first display is disposed with respect to the opening direction.

In one embodiment, the at least one first display may be disposed to be spaced apart by a predetermined distance from a front surface of the semi-transmissive mirror so as to allow the virtual image to be formed at a distance equal to a distance between the real image and the rear surface of the semi-transmissive mirror, wherein the real image and the virtual image are spaced apart by the same distance from the rear surface of the semi-transmissive mirror, and aligned side by side along an axis formed with respect to the semi-transmissive mirror.

In one embodiment, for the plurality of displays, the first display and the second display may be disposed to cross with respect to the semi-transmissive mirror so as to allow an edge area of the first display that displays an image corresponding to the virtual image and an edge area of the second display that displays an image corresponding to the real image to overlap with each other on one axis formed with respect to the semi-transmissive mirror.

In one embodiment, for at least one of the first and second displays, the edge areas of the virtual and real images that overlap with each other according to the first and second displays disposed to cross with respect to the semi-transmissive mirror so as to allow the edge areas to overlap with each other on the one axis may be synthesized according to an edge blending technique to connect the virtual and real images into a single image.

In one embodiment, the first display may be disposed at a lower side of the opening direction of the opening surface, and disposed to be inclined at a preset angle with respect to the opening direction.

In one embodiment, a light transmittance of the semi-transmissive mirror may be adjusted so as to allow a brightness of the virtual image and a brightness of the real image to be the same.

In one embodiment, the semi-transmissive mirror may have a titanium-deposited polarizing reflective layer.

In one embodiment, the plurality of displays may include two first displays disposed at a front surface side of the semi-transmissive mirror and at an upper or lower side of the opening direction of the opening surface, and one second display disposed at a rear surface side of the semi-transmissive mirror to face the opening direction, wherein the two first displays are a driver seat display disposed in front of a driver seat and a passenger display disposed in In one embodiment, the plurality of displays may include two second displays disposed at a rear surface side of the semi-transmissive mirror to face the opening direction, and one first display disposed at a front surface side of the semi-transmissive mirror and at an upper or lower side of the opening direction of the opening surface, wherein the two second displays are a driver seat display disposed in front of a driver seat and a passenger display disposed in front of a passenger seat, respectively.

In one embodiment, the plurality of displays may include one first display disposed at a front surface side of the semi-transmissive mirror and at an upper or lower side of the opening direction of the opening surface, and one second display disposed at a rear surface side of the semi-transmissive mirror to face the opening direction, wherein either one of the first and second displays is a driver seat display disposed in front of a driver seat, and the other one of the first and second displays is a passenger seat display disposed in front of a passenger seat.

In one embodiment, among the plurality of display, at least one first display may output a left-right reversed image.

In one embodiment, the plurality of displays may be a plurality of curved displays having the same curvature, and may be disposed to cross alternately at front and rear surface sides of the semi-transmissive mirror on one axis formed with respect to the semi-transmissive mirror so as to allow curved virtual and real images formed by being reflected or transmitted by the semi-transmissive mirror to have the same center of curvature.

In one embodiment, the plurality of displays may include two first curved displays disposed at a front surface side of the semi-transmissive mirror and at an upper or lower side of the opening direction of the opening surface, and one second curved display disposed at a rear surface side of the semi-transmissive mirror to face the opening direction, wherein the two first curved displays are disposed such that a portion closer to the curved real image formed from the second curved display is disposed farther away from the semi-transmissive mirror, and a portion farther away from the curved real image is closer to the semi-transmissive mirror.

In one embodiment, the plurality of displays may include two second curved displays disposed at a rear surface side of the semi-transmissive mirror to face the opening direction, and one first curved display disposed at a front surface side of the semi-transmissive mirror and at an upper or lower side of the opening direction of the opening surface, wherein the two second curved displays are disposed so as to have the same center of curvature, and the one first curved display is disposed at a position spaced apart by a predetermined distance from the semi-transmissive mirror so as to form a curved virtual image along the center of curvature.

In one embodiment, the housing may be at least part of an internal frame of a vehicle constituting at least one of a front of a driver seat and a front of a passenger seat of the vehicle.

Advantageous Effects of Invention

The effects of a display structure according to the present disclosure are as follows.

According to at least one of embodiments of the present disclosure, the present disclosure may connect a real image transmitted through a semi-transmissive mirror and a virtual image reflected through the semi-transmissive mirror to each other, thereby allowing images displayed on a plurality of displays to be optically connected to one another. Accordingly, the present disclosure may connect images displayed on a plurality of displays to one another through overlapping of images, thereby having an effect implementing an integrated display area in which a plurality of displays are connected without a non-display area such as a bezel area.

According to at least one of embodiments of the present disclosure, a transmittance of a semi-transmissive mirror may be adjusted, thereby allowing a brightness of a real image formed by transmitting through the semi-transmissive mirror to be matched to that of a virtual image reflected through the semi-transmissive mirror. Accordingly, the present disclosure has an effect of allowing the brightness of each area of the large screen display area to be maintained the same.

MODE FOR THE INVENTION

Figure 1:
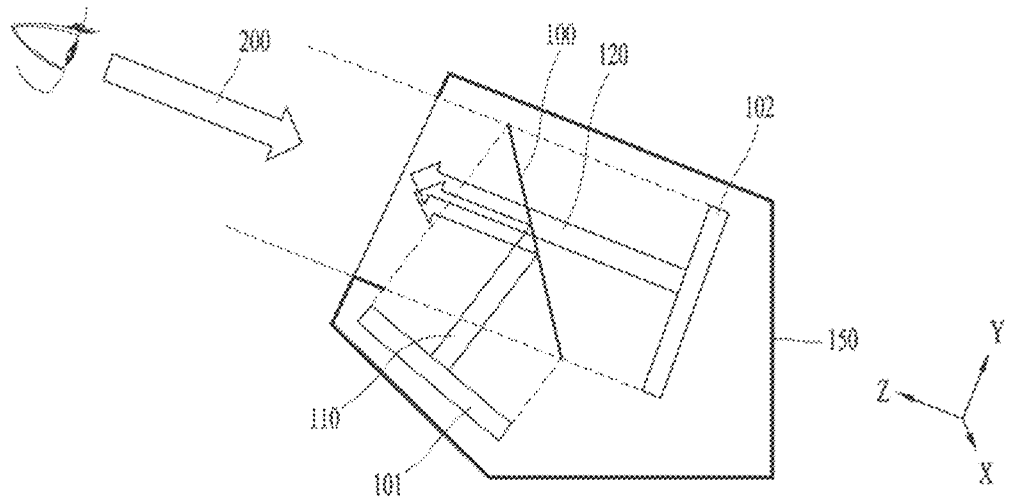
FIG. 1 is an X-axis cross-sectional view of a display structure according to an embodiment of the present disclosure.

It should be noted that the technical terms used herein are merely used to describe a specific embodiment, but are not intended to limit the present disclosure. In addition, a singular expression used herein may include a plural expression unless clearly defined otherwise in the context. A suffix "module" or "unit" used for elements disclosed in the following description is merely intended for easy description of the specification, and the suffix itself is not intended to have any special meaning or function.

As used herein, terms such as “comprise” or “include” should not be construed to necessarily include all elements or steps described herein, and should be construed not to include some elements or some steps thereof, or should be construed to further include additional elements or steps.

In addition, in describing technologies disclosed herein, when it is determined that a detailed description of known technologies related thereto may unnecessarily obscure the subject matter disclosed herein, the detailed description will be omitted.

Furthermore, the accompanying drawings are provided only for a better understanding of the embodiments disclosed in this specification and are not intended to limit technical concepts disclosed in this specification, and therefore, it should be understood that the accompanying drawings include all modifications, equivalents and substitutes within the concept and technical scope of the present disclosure. In addition, not only respective embodiments described below, but also combinations of embodiments can of course be included within the concept and technical scope of the present disclosure as modifications, equivalents or substitutes.

First, a display structure according to an embodiment of the present disclosure may be provided with displays that output various image information related to a vehicle. Here, various image information related to the vehicle may include an image around the vehicle acquired from a camera disposed in the vehicle and graphic objects displayed on the acquired image around the vehicle, for example, an augmented reality object or the like. In addition, the image information may include image information related to driver convenience, such as infotainment functions and autonomous driving functions provided in the vehicle, and information to help secure a driver’s field of vision, such as night vision or blind spots. The functions related to driver convenience may include functions such as active cruise control (ACC), smart parking assist system (SPAS), night vision (NV), head up display (HUD), around view monitor (AVM), and lane departure warning system (LDWS).

In addition, the image information may include dashboard information to convey the vehicle’s driving status and operation information of each device provided in the vehicle to the driver. As such, the vehicle’s dashboard information may be provided to the driver as image information displayed through a display, and the vehicle’s display, which provides information on the driving of the vehicle and the operation of each device provided in the vehicle in such a manner, may also be referred to as a digital cluster, including a frame (cluster) disposed inside the vehicle on a front surface portion of a driver seat or front surface portions of a driver seat and a passenger seat.

FIG. 1 shows an example (X-axis cross-sectional view) of a display structure according to an embodiment of the present disclosure in which a plurality of displays that output image information related to a vehicle are disposed in such a manner.

Referring to FIG. 1, a display structure according to an embodiment of the present disclosure may include a semi-transmissive mirror 100, at least one first display 101 disposed on a front surface side of the semi-transmissive mirror 100, at least one second display 102 disposed on a rear surface side of the semi-transmissive mirror 100, and a housing 150 that accommodates the semi-transmissive mirror 100, the at least one first display 101, and the at least one second display 102.

Here, the housing 150 may be at least part of an internal frame of the vehicle constituting a front exterior of the driver seat of the vehicle. In addition, the housing 150 may be disposed such that one side thereof is open in consideration of a normal eye height of a driver seated in the driver seat so as to allow the driver to identify the semi-transmissive mirror 100 accommodated thereinside. In this case, an opening surface of the housing 150 may be disposed to face an eye position of a virtual driver seated in a driver seat according to a preset eye height assuming the driver seated in the driver seat, and hereinafter, a virtual straight line connecting the center of the opening surface from the eye position of the virtual driver is referred to as the driver’s gaze, and a direction corresponding to the virtual straight line is referred to as a gaze direction 200. Here, the gaze direction 200 may also be referred to as an opening direction in which the housing 150 is open.

First, the semi-transmissive mirror 100 may be a mirror disposed to reflect light incident on a front surface of the semi-transmissive mirror 100 and transmit light incident on a rear surface of the semi-transmissive mirror 100. To this end, the semi-transmissive mirror 100 may be provided with a flat reflective layer deposited with titanium or the like, and may have a size corresponding to the projection surfaces of displays that emit image light incident on the rear and front surfaces.

In addition, the semi-transmissive mirror 100 may be a semi-transmissive mirror whose light transmittance is adjusted so as to allow a brightness of an image (virtual image) reflected by the semi-transmissive mirror 100 and a brightness of an image (real image) transmitted by the semi-transmissive mirror 100 to be the same. Accordingly, the brightness of the virtual image and the brightness of the real image may become the same.

Therefore, when the second display 102 is disposed at a rear surface side of the semi-transmissive mirror 100, an image displayed on the second display 102, that is, image light 120 emitted from the second display 102, may be incident at the rear surface side of the semi-transmissive mirror 100. Then, the image light 120 of the second display 102 may pass through the semi-transmissive mirror 100. On the contrary, when the first display 101 is disposed at a front surface side of the semi-transmissive mirror 100, an image displayed on the first display 101, that is, image light 110 emitted from the first display 101, may be incident at the front surface side of the semi-transmissive mirror 100. Then, the image light 110 of the first display 101 may be reflected from a front surface of the semi-transmissive mirror 100.

In this case, a reflection image reflected from the front surface of the semi-transmissive mirror 100 may generate a virtual image corresponding to the image displayed on the first display 101. The virtual image may be formed at a distance spaced apart in a rear direction of the semi-transmissive mirror 100 by a distance that is proportional to a distance at which the first display 101 is spaced apart from the front surface of the semi-transmissive mirror 100. Therefore, an image (virtual image) corresponding to the first display 101 may be formed on a rear surface side of the semi-transmissive mirror 100.

On the contrary, a transmission image passing through the semi-transmissive mirror 100 may generate a real image corresponding to an image displayed on the second display 102. In this case, the real image, which is an image actually formed on the semi-transmissive mirror 100 with respect to the second display 102, may be actually formed at the same position as that of the second display 102. Accordingly, the real image may be formed on a rear surface side of the semi-transmissive mirror 100 on which the second display 102 is disposed.

Therefore, through the semi-transmissive mirror 100, both a virtual image corresponding to the image of the first display 101 and a real image corresponding to the image of the second display 102 may be formed at the rear surface side of the semi-transmissive mirror 100.

Meanwhile, in order to prevent the first display 101 that irradiates the image light 110 to the front surface of the semi-transmissive mirror 100 from blocking the semi-transmissive mirror 100 from the driver's gaze, the first display 101 may be disposed at a lower or upper side with respect to the gaze direction 200. In this case, the semi-transmissive mirror 100 may be disposed to be inclined at a predetermined angle in a direction in which the first display 101 is disposed with respect to the gaze direction 200 in order to reflect the image light 110 emitted from the first display 101.

Therefore, as shown in FIG. 1, the first display 101 may be disposed at a lower side with respect to the gaze direction 200, that is, at a lower front side of the semi-transmissive mirror 100. In this case, the first display 101 may be disposed at a bottom of the housing 150, that is, at a bottom of a vehicle internal frame (hereinafter referred to as a cluster) constituting a front surface portion of the driver seat. Then, the semi-transmissive mirror 100 may be disposed to be inclined so as to allow a front surface thereof to be tilted downward in a direction in which the first display 101 is disposed, that is, the gaze direction 200. In addition, the semi-transmissive mirror 100 may be disposed to be inclined at an angle so as to allow a virtual image formed by the semi-transmissive mirror 100 to be formed in a direction facing the gaze However, when boarding the vehicle, prior to being seated in the driver seat, the driver's eye position may be higher than that shown in FIG. 1. Accordingly, since the driver's gaze direction forms a higher angle, as shown in FIG. 1, a problem may arise in which the first display 101 disposed at a lower front side of the semi-transmissive mirror 100 is exposed to the driver's gaze direction.

In order to avoid such a problem, the first display 101 may be disposed at a predetermined angle with respect to the driver's normal gaze direction 200. As an example, as shown in FIG. 1, when the first display 101 is disposed not perpendicular to the gaze direction 200 but tilted at a predetermined angle (e.g., 44 degrees) with respect to the gaze direction 200, even when the driver views the display structure according to an embodiment of the present disclosure from a higher position than the eye position corresponding to the normal gaze direction 200, the first display 101 may not be exposed to the driver's gaze due to the inclined disposition of the first display 101.

Meanwhile, unlike the first display 101, the second display 102 may be disposed in a direction facing the gaze direction 200. Accordingly, a real image formed through the semi-transmissive mirror 100 may also be formed in a direction facing the gaze direction 200 from a rear side of the semi-transmissive mirror 100. However, since the virtual image is also formed to face the gaze direction 200 from the rear side of the semi-transmissive mirror 100 due to the inclination angle of the semi-transmissive mirror 100, both the real image and the virtual image may be formed to face the gaze direction 200 from Meanwhile, according to the foregoing description, a position at which the virtual image is generated may be determined according to a distance at which the first display 101 is spaced apart from the semi-transmissive mirror 100. Therefore, the first display 101 may be disposed to be spaced apart from the semi-transmissive mirror 100 so as to allow the virtual image to be formed at a distance that matches a distance on the Z-axis (gaze direction 200) at which the real image is formed from the semi-transmissive mirror 100. In this case, a virtual image (an image of the first display 101) formed by being reflected from the semi-transmissive mirror 100 and a real image (an image of the second display 102) formed by being transmitted from the semi-transmissive mirror 100 may be formed at the same distance on the Z axis from the semi-transmissive mirror 100. Accordingly, the real image formed through the second display 102 and the virtual image formed through the first display 101 may be formed at a position spaced apart by the same distance along the Z axis from the rear side of the semi-transmissive mirror 100. Thus, the real and virtual images may be aligned in a direction facing the gaze direction 200 along the Z-axis from the rear side of the semi-transmissive mirror 100.

For the alignment, the first display 101 and the second display 102 may be respectively disposed at positions spaced apart from the semi-transmissive mirror 100 by a predetermined distance, as shown in FIG. 1. Furthermore, depending on a distance at which the second display 102 is spaced apart from the semi-transmissive mirror 100, a distance at which the first display 101 is spaced apart from the semi-transmissive mirror 100 may be Due to such a disposition structure of displays as described above, a display structure according to an embodiment of the present disclosure may be configured such that, when at least one first display 101 and at least one second display 102 are disposed to cross in front of and behind the semi-transmissive mirror 100 along one axis (X-axis) with respect to the semi-transmissive mirror 100, an image (virtual image) of the first display 101 and an image (real image) of the second display 102 are aligned side by side in one direction (X-axis direction) along the semi-transmissive mirror 100 at a rear side of the semi-transmissive mirror 100.

As described above, a display structure according to an embodiment of the present disclosure may be configured such that at least one first display 101 and at least one second display 102 are disposed to cross in front of and behind the semi-transmissive mirror 100 along one axis (X-axis) direction based on the semi-transmissive mirror 100. Therefore, physical spaces where respective displays are disposed may be disposed alternately to one another.

As an example, a display structure according to an embodiment of the present disclosure may be configured such that three displays including at least one first display 101 and at least one second display 102 with the semi-transmissive mirror 100 at the center are disposed to cross in front of and behind the semi-transmissive mirror 100 with the semi-transmissive mirror 100 at the center. A display structure in which three displays are disposed to cross one another with the semi-transmissive mirror 100 at the center in such a manner is referred to as a first embodiment of the present disclosure.

Figure 2:
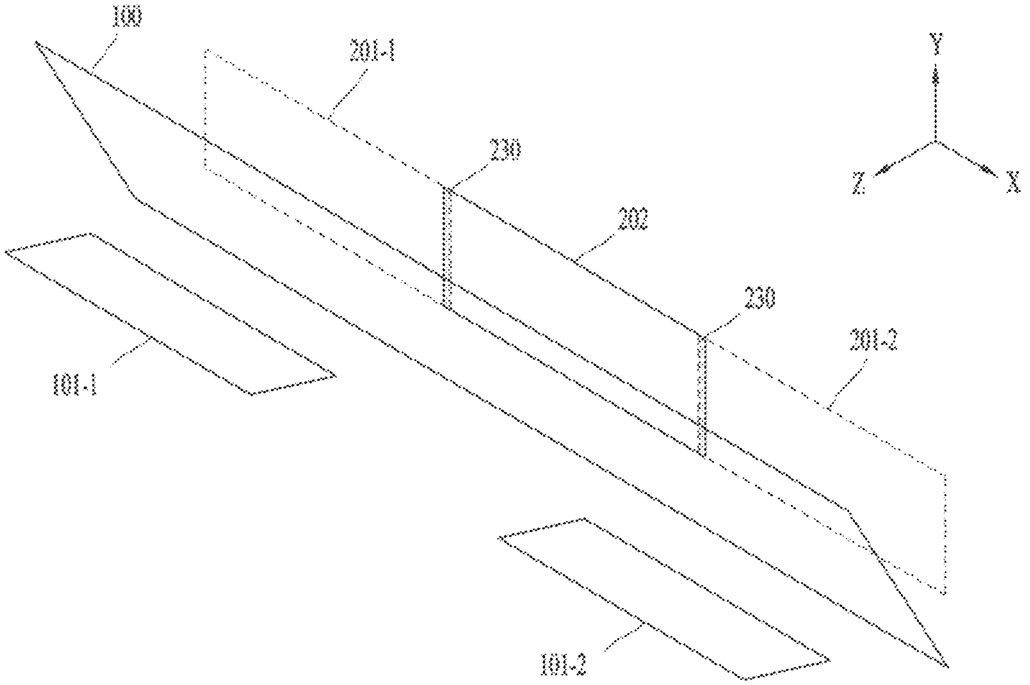
FIG. 2 is a perspective view of a display structure according to a first embodiment of the present disclosure and a cross-sectional view showing a Y-axis cross-section of an integrated display area formed according to an embodiment of the present disclosure.
Figure 2:
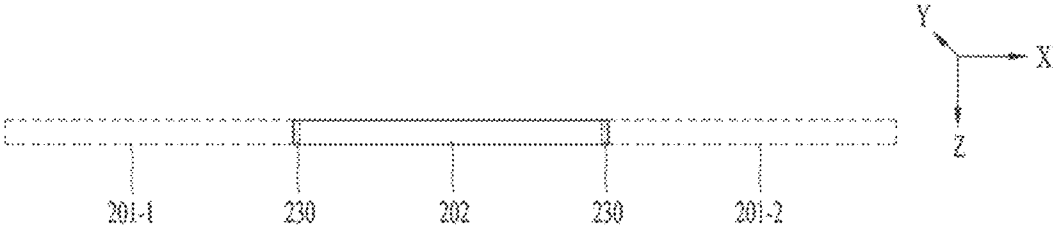

(a) of FIG. 2 is a perspective view of a display structure configured as described above according to a first embodiment of the present disclosure.

Referring to FIG. 2, a display structure according to a first embodiment of the present disclosure, as shown in (a) of FIG. 2, may be configured such that two first displays 101-1, 101-2 are disposed at a front surface side of the semi-transmissive mirror 100, and one second display 102 is disposed at a rear surface side of the semi-transmissive mirror 100 so as to allow a first-1 display 101-1, a second display 102, and a first-2 display 101-2 to be disposed to cross in front of and behind the semi-transmissive mirror 100 with the semi-transmissive mirror 100 at the center. In this case, a first virtual image 201-1 and a second virtual image 201-2 corresponding to respective image lights of the first displays 101-1, 101-2 may be formed at a rear surface side of the semi-transmissive mirror 100. Additionally, a real image 202 corresponding to image light of the second display 102 may be formed at a rear surface side of the semi-transmissive mirror 100.

As shown in (a) of FIG. 2, when the two first displays 101-1, 101-2 and one second display 102 are disposed to cross one another with the semi-transmissive mirror 100 at the center, a real image 202 may be formed between the first virtual image 201-1 and the second virtual image 201-2. In this case, the respective first displays 101-1, 101-2 may be disposed to be spaced apart from the semi-transmissive mirror 100 so as to allow the first virtual image 201-1 and the second virtual image 201-2 to be formed at a distance on the Z-axis corresponding to a distance to the semi-transmissive mirror 100 where the real image 202 is formed. Accordingly, the first virtual image 201-1, the real image 202, and the second virtual image 201-2 may be formed at positions spaced apart from a rear surface of the semi-transmissive mirror 100 by the same Therefore, as shown in (b) of FIG. 2, the first virtual image 201-1, the real image 202, and the second virtual image 201-2 may be aligned side by side in one axis (X-axis) direction along the semi-transmissive mirror 100.

Meanwhile, the first virtual image 201-1, the real image 202, and the second virtual image 201-2 formed from images output from the first-1 display 101-1, the second display 102, and the first-2 display 101-2, respectively, may be connected to one another as shown above in (b) of FIG. 2. That is, such as in a pillar-to-pillar (P2P) display, including a plurality of displays, image information output from the respective displays may be connected to one another to generate an integrated display area with an extended display area in the X-axis direction.

Here, a virtual image formed by the semi-transmissive mirror 100 is reversed left and right due to reflection. Accordingly, the first-1 display 101-1 and the first-2 display 101-2 may each output a left-right reversed image. Then, due to a left-right reversal caused by reflection, the images output from the three displays may be connected and displayed in one direction.

Meanwhile, as shown in (b) of FIG. 2, in order to connect the first virtual image 201-1, the real image 202, and the second virtual image 201-2 to one another according to an edge blending technique, one side (e.g., left) edge area of the real image 202 may be overlapped with the other side (e.g., right) edge area of the first virtual image 201-1. Additionally, the other side (e.g., right) edge area of the real image 202 may also overlap with one side (e.g., left) edge area of the second virtual image 201-2.

Edge blending technique, which is a technique for removing a non-display area, such as a bezel area, formed at an edge of a display area and where no image is displayed, may refer to an image processing technique that removes edge portions of respective images where the non-display areas are formed by overlapping each other.

As such, the edge blending technique, which removes the non-display area through overlapping images, cannot be applied when a plurality of displays having a physical circuit and a thickness due to the circuit are connected due to a physical bezel area disposed at an edge of a circuit of each of the displays. That is, when the displays are aligned and connected to one another, it is difficult to overlap images due to the physical bezel area of each of the displays.

On the contrary, in the case of a display structure according to an embodiment of the present disclosure, it is configured such that a virtual image and a real image formed through the semi-transmissive mirror 100 are optically overlapped with each other. That is, as described above, since the displays are physically disposed to cross in front of and behind the semi-transmissive mirror 100 with the semi-transmissive mirror 100 at the center, a Z-axis position of the first display 101 that emits an image corresponding to the virtual image and a Z-axis position of the second display 102 that emits an image corresponding to the real image may be different from each other. Therefore, physical overlapping between the first display 101 and the second display 102 may not occur. In addition, a virtual image reflected through the semi-transmissive mirror 100 and a real image transmitted through the semi-transmissive mirror 100 may be overlapped with each other so as to display an extended image in which the respective images are connected. Therefore, it may be possible to apply an edge blending technique using overlapping of images regardless of a physical thickness and bezel area of a display, and through the edge blending technique, images displayed on respective displays may be connected to one another and displayed without a non-display area.

Figure 3:
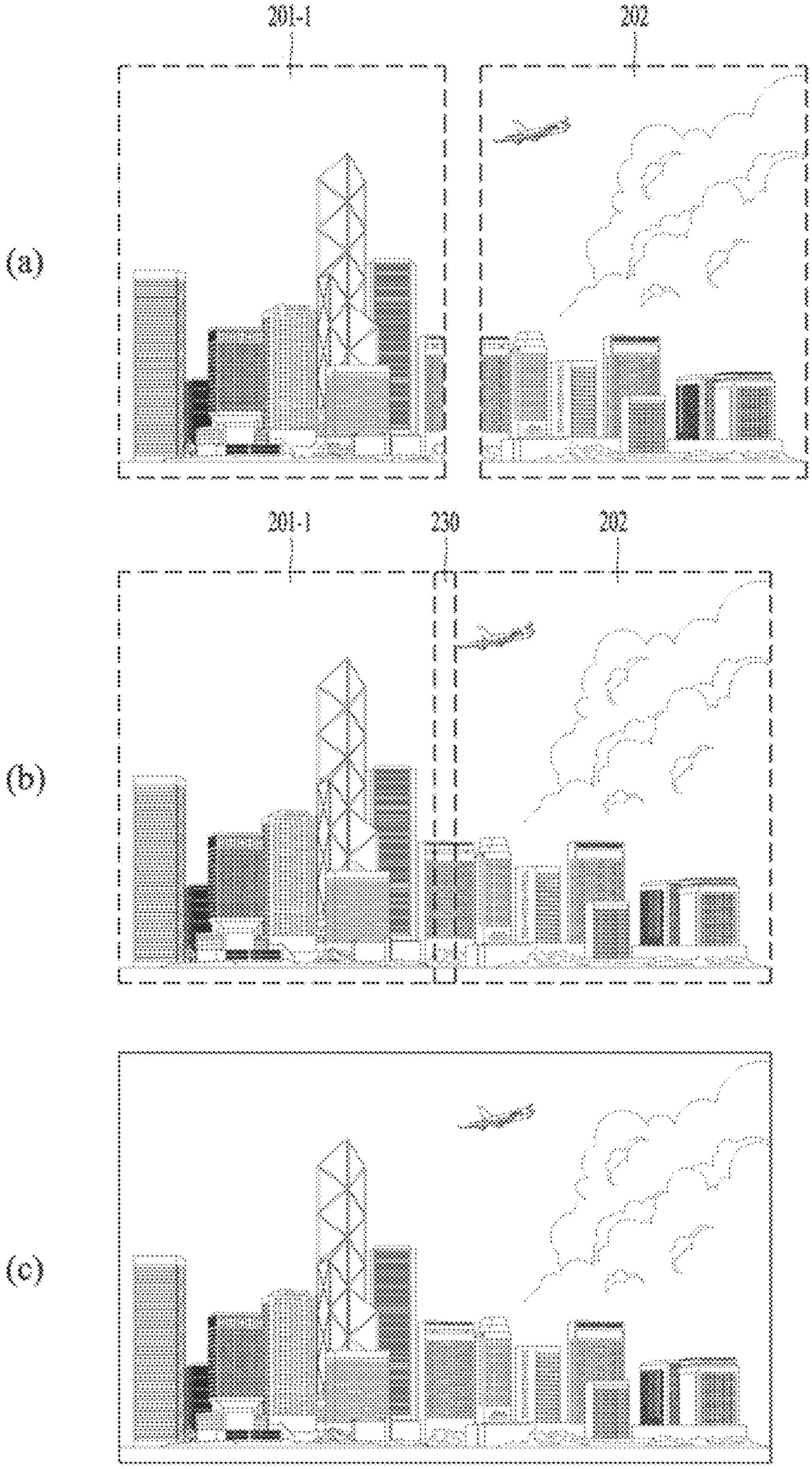
FIG. 3 is an exemplary diagram showing an example in which an edge area of a virtual image and an edge area of a real image are overlapped and synthesized in a display structure according to an embodiment of the present disclosure.

Referring to FIG. 3, which shows such an example of edge blending, first, an image on the left shown in (a) of FIG. 3 may be a first virtual image 201-1 formed by reflecting image light emitted from the first-1 display 101-1 by the semi-transmissive mirror 100. Furthermore, an image on the right shown in (a) of FIG. 3 may be a real image 202 formed by transmitting image light emitted from the second display 102 by the semi-transmissive mirror 100. Here, as shown in (a) of FIG. 2, the first-1 display 101-1 may be disposed at a positive position (in front of the semi-transmissive mirror 100) in the Z-axis direction around the X-axis, and the second display 102 may be disposed at a negative position (behind the semi-transmissive mirror 100) in the Z-axis direction around the X-axis.

Therefore, even when the first-1 display 101-1 is disposed at a position on the X-axis close to a position on the X-axis corresponding to the second display 102, no physical overlap occurs between the first-1 display 101-1 and the second display 102. Accordingly, as shown in (b) of FIG. 3, an overlap 230 between a left edge area of the real image 202 formed by the second display 102 and a right edge area of the first virtual image 201-1 formed by the first-1 display 101-1 may be formed with respect to the X-axis. Furthermore, when the overlap 230 between the image edge areas is formed, the first virtual image 201-1 and the real image 202 may be connected and displayed into a single image without a non-display area through image synthesis according to In a similar manner as shown in FIG. 3, the real image 202 and the second virtual image 101-2 may also be synthesized into a single image. Therefore, as shown in (b) of FIG. 2, the right edge area of the first virtual image 201-1 and the left edge area of the real image 202, and the right edge area of the real image 202 and the left edge area of the second virtual image 201-2 may be overlapped and synthesized. Accordingly, the first virtual image 201-1, the real image 202, and the second virtual image 201-2 formed by the first-1 display 101-1, the second display 102, and the first-2 display 101-2, respectively, may be connected to one another and synthesized into a single image without a non-display area so as to generate an integrated display area extended in the X-axis direction.

Meanwhile, the edge area of each of the overlapping images may be an area corresponding to a preset number of pixels. As an example, the edge area may be an area corresponding to 10 pixels. In this case, the positions of the first-1 display 101-1, the second display 102, and the first-2 display 101-2 on the X-axis may be determined in such a manner that a right edge of the first-1 display 101-1 and a left edge of the second display 102, and a right edge of the second display 102 and a left edge of the first-2 display 101-2 overlap by an area corresponding to 10 pixels, respectively.

Meanwhile, in FIG. 2, it has been described an example in which two virtual images 201-1, 201-2 and one real image 202 are connected to one another to generate the integrated display area. However, on the contrary, a display structure according to a first embodiment of the present disclosure may be configured such that two second displays and one first display 101 are disposed to cross in front of and behind the semi-transmissive mirror 100 with the semi-transmissive mirror 100 at the center.

Figure 4:
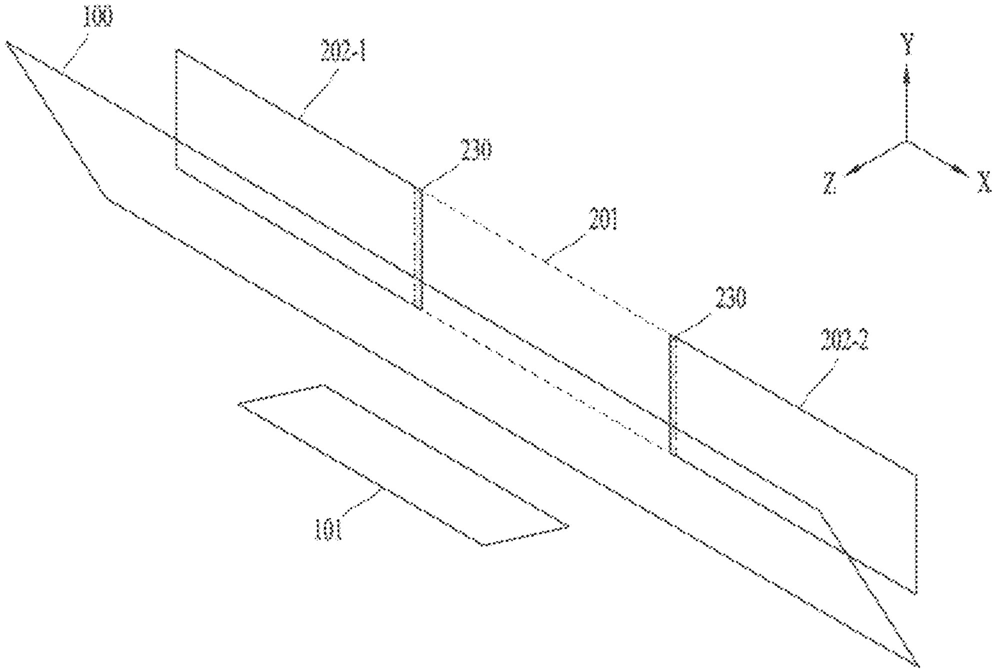
FIG. 4 is a perspective view of another display structure according to a first embodiment of the present disclosure and a cross-sectional view showing a Y-axis cross-section of an integrated display area formed according to an embodiment of the present disclosure.
Figure 4:
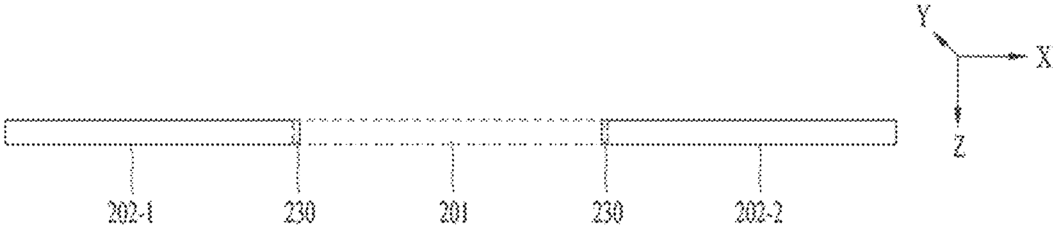

FIG. 4 shows a perspective view of a display structure according to a first embodiment of the present disclosure, that is, an another first embodiment of the present disclosure, and a cross-sectional view showing a Y-axis cross-section of an integrated display area formed according to an embodiment of the present disclosure.

First, (a) of FIG. 4 is a perspective view of a display structure configured as described above according to another first embodiment of the present disclosure.

Referring to (a) of FIG. 4, a display structure according to a first embodiment of the present disclosure may be configured such that two second displays 102 are disposed in front of the semi-transmissive mirror 100, and one first display 101 is disposed behind the semi-transmissive mirror 100 to cross with the semi-transmissive mirror 100 at the center.

In this case, a first real image 202-1 and a second real image 202-2 corresponding to respective image lights of the second displays 102 may be formed at a rear surface side of the semi-transmissive mirror 100. Additionally, a virtual image 201 corresponding to image light of the first display 101 may be formed at a rear surface side of the semi-transmissive mirror 100.

Meanwhile, when the two second displays 102 and one first display 101 are disposed to cross each other with the semi-transmissive mirror 100 at the center, a virtual image 201 may be formed between the first real image 202-1 and the second real image 202-2, as shown in (a) of FIG. 4. In this case, the first display 101 may be disposed at a position spaced apart from the semi-transmissive mirror 100 such that the virtual image 201 is formed at a distance corresponding to a distance on the Z axis to the semi-transmissive mirror 100 where the first real image 202-1 and the second real image 202-2 are formed. Accordingly, the first real image 202-1, the virtual image 201, and the second real image 202-2 may be formed at positions spaced apart from a rear surface of the semi-transmissive mirror 100 by the same distance in the Z-axis direction.

Thus, as shown in (b) of FIG. 4, the first real image 202-1, the virtual image 201, and the second real image 202-2 may be aligned side by side in one axis (X-axis) direction along the semi-transmissive mirror 100.

Meanwhile, the first real image 202-1, the virtual image 201, and the second real image 202-2, which are formed from images output from two second displays and one first display 101 disposed between the two second displays on the X-axis, may be connected to one another as shown above in (b) of FIG. 4. That is, such as in a pillar-to-pillar (P2P) display, including a plurality of displays, image information output from the respective displays may be connected to one another to generate an integrated display area with an extended display area in the X-axis direction.

Here, a virtual image formed by the semi-transmissive mirror 100 is reversed left and right due to reflection. Accordingly, the first display 101 may output a left-right reversed image. Then, due to a left-right reversal caused by reflection, the images output from the three displays may be connected and displayed in one direction.

Meanwhile, the first display 101 may be disposed at a position on the X-axis where an edge area corresponding to a predetermined number of pixels overlaps with the second displays disposed on left and right sides of the X-axis. Therefore, a right edge area of the first real image 202-1 and a left edge area of the second real image 202-2 along the X-axis may overlap with a left edge area and a right edge area of the virtual image 201, respectively. Furthermore, the overlapping areas may be synthesized and connected into a single image according to the edge blending method.

Meanwhile, as shown above in FIG. 2, when the integrated display area is generated with two virtual images 201-1, 201-2 and one real image 202, the first-1 display 101-1 and the first-2 display 101-2 may be a display disposed on the driver seat and a display disposed on the passenger seat, respectively. In this case, the driver seat display and the passenger seat display may be displays disposed at a lower side with respect to the driver's gaze direction 200, that is, a bottom of the cluster, to generate a virtual image.

On the contrary, as shown above in the FIG. 4, when the integrated display area is generated with two real images 202-1, 202-2 and one virtual image 202, two second displays corresponding to the two real images 202-1, 202-2 may be a display disposed on the driver seat and a display disposed on the passenger seat, respectively. In this case, the driver seat display and the passenger seat display may be displays disposed to face the driver's gaze direction 200 to generate a real image.

Meanwhile, in the foregoing description, it has been described that three displays are disposed, in which at least one first display 101 and at least one second display 102 are disposed to cross one another with respect to the semi-transmissive mirror 100 (X-axis), and an integrated display area extended in the X-axis direction is generated with two virtual images and one real image, or two real images and one virtual image, which are generated from the three displays.

However, on the contrary, for the integrated display area, one virtual image and one real image formed from two displays disposed to cross in front of and behind the semi-transmissive mirror 100 with the semi-transmissive mirror 100 at the center may of course be connected to one another to generate the extended integrated display area. A display structure according to an embodiment of the present disclosure that generates an integrated display area by connecting one virtual image and one real image formed from two displays disposed to cross with respect to the semi-transmissive mirror 100 in such a manner is referred to as a second embodiment of the present disclosure.

Figure 5:
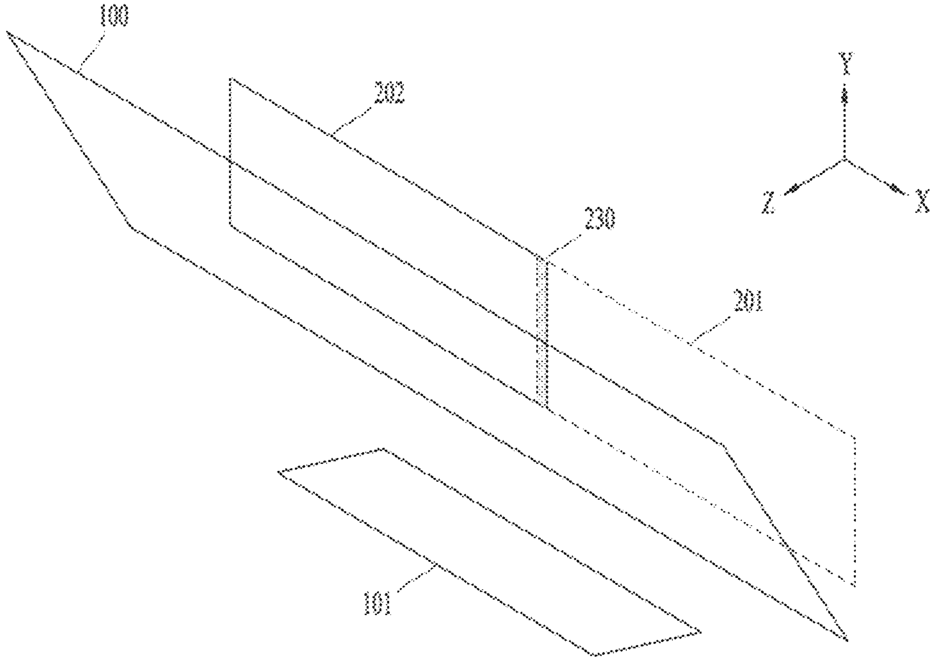
FIGS. 5 and 6 are perspective views of a display structure according to a second embodiment of the present disclosure and cross-sectional views showing a Y-axis cross-section of an integrated display area formed according to an embodiment of the present disclosure.
Figure 5:
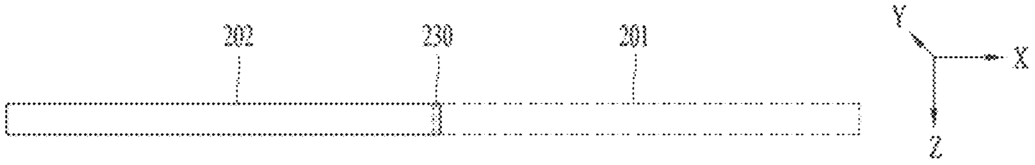
Figure 6:
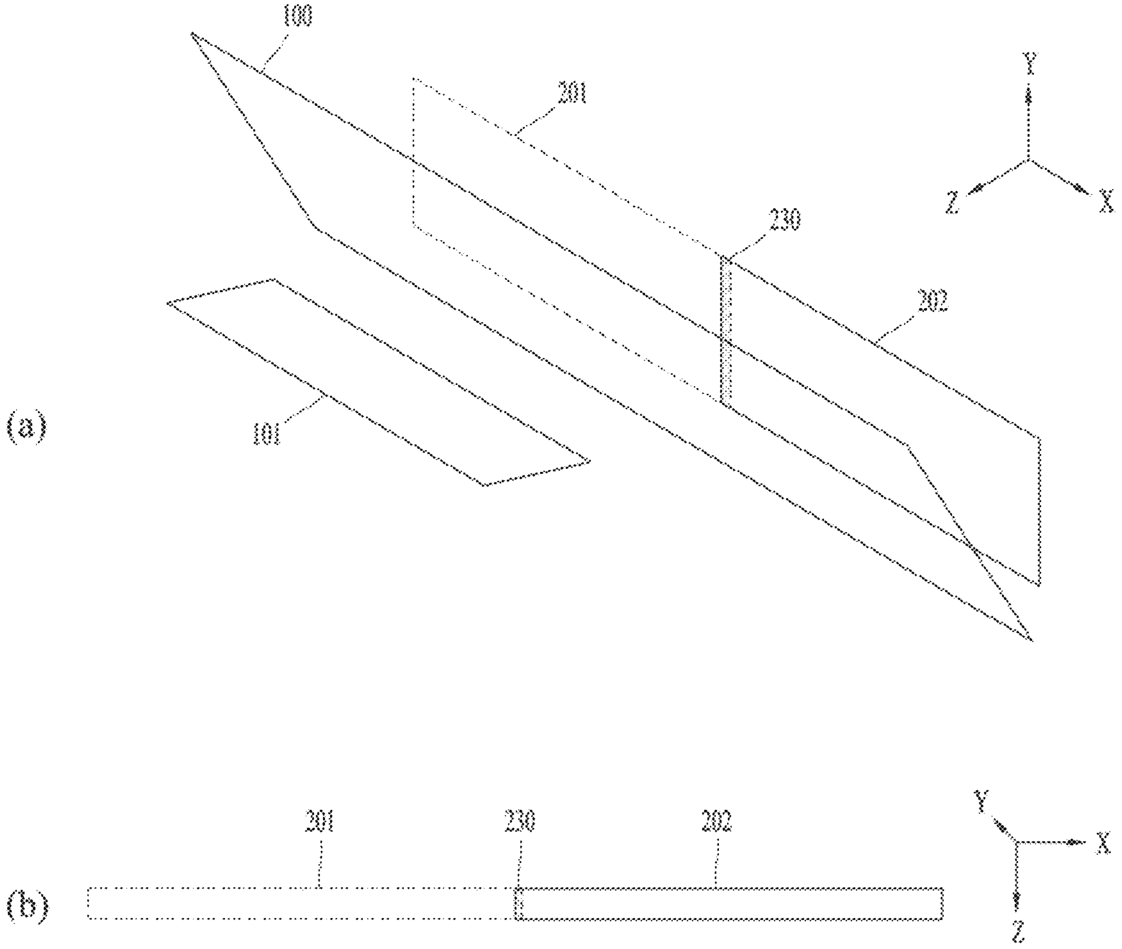

FIGS. 5 and 6 are perspective views of such a display structure according to a second embodiment of the present disclosure and cross-sectional views showing a Y-axis cross-section of an integrated display area formed according to an embodiment of the present disclosure.

First, referring to (a) of FIG. 5, a display structure according to a second embodiment of the present disclosure may be configured such that one second display 102 and one first display 101 are disposed to cross each other with respect to the semi-transmissive mirror 100. In this case, a real image 202 corresponding to image light of the second display 102 and a virtual image 201 corresponding to image light of the first display 101 may be formed at a rear surface side of the semi-transmissive mirror 100.

Meanwhile, the first display 101 may be disposed at a position spaced apart from the semi-transmissive mirror 100 such that the virtual image 201 is formed at a distance corresponding to a distance on the Z axis to the semi-transmissive mirror 100 where the real image 202 is formed. Therefore, the real image 202 and the virtual image 201 may be formed at positions spaced apart from a rear surface of the semi-transmissive mirror 100 by the same distance in the Z-axis direction.

Thus, as shown in (b) of FIG. 5, the real image 202 and the virtual image 201 may be aligned side by side in one axis (X-axis) direction along the semi-transmissive mirror 100 and connected to each other. That is, such as in a pillar-to-pillar (P2P) display, including a plurality of displays, image information output from the respective displays may be connected to one another to generate an integrated display area with an extended display area in the X-axis direction.

Here, a virtual image formed by the semi-transmissive mirror 100 is reversed left and right due to reflection. Accordingly, the first display 101 may output a left-right reversed image. Then, due to a left-right reversal caused by reflection, the images output from the respective displays may be connected and displayed in one direction.

Meanwhile, on the X-axis, the first and second displays 101, 102 may be disposed so as to allow a left edge area of the real image 202 to overlap with a right edge area of the virtual image 201. Furthermore, the overlapping edge areas of the real image 202 and virtual image 201 may be synthesized according to the edge blending method. Therefore, image information output from respective displays may be connected to each other to generate an integrated display area with an extended display area in the X-axis direction.

Meanwhile, the two displays that create the integrated display area may be a driver seat display disposed on the driver seat and a passenger seat display disposed on the passenger seat, respectively. For example, in a case such as FIG. 5, the second display 102 may be a display disposed on the driver seat, and the first display 101 may be a display disposed on the passenger seat. In this case, the driver seat display may be a display disposed to face the driver's gaze direction 200 (Z-axis), and the passenger seat display may be a display disposed at a lower side with respect to the gaze direction 200 (Z-axis).

Meanwhile, FIG. 6 assumes an example in which, unlike shown above in FIG. 5, the driver seat display is the first display 101 and the passenger seat display is the second display 102. In this case, as shown in (a) of FIG. 6, the driver seat display may be a display disposed at a lower side with respect to the gaze direction 200 (Z-axis), and the passenger seat display may be a display disposed to face the gaze direction 200 (Z-axis).

In this case, a virtual image 201 corresponding to image light of the driver seat display 101 and a real image 202 corresponding to image light of the passenger seat display 102 may be formed at a rear surface side of the semi-transmissive mirror 100. Furthermore, as shown in (b) of FIG. 6, the virtual image 201 and the real image 202 may be aligned side by side in the X-axis direction, and the edge areas may be overlapped and synthesized with each other to be connected to each other.

In addition, in a case such as FIG. 6, the driver seat display may output a left-right reversed image in consideration of that the image is reflected from the semi-transmissive mirror 100 and reversed left and right. Accordingly, images output from the driver seat display and the passenger seat display may be displayed in an integrated display area in which the virtual image 201 and the real image 202 are connected in one direction.

Meanwhile, a display structure according to an embodiment of the present disclosure may of course form an integrated display area constituting a curved surface by including a plurality of curved displays having the same curvature. A display structure according to an embodiment of the present disclosure that forms an integrated display area extended in the X-axis direction through a plurality of curved displays in this manner is referred to as a third embodiment of the present disclosure.

According to the third embodiment of the present disclosure, a plurality of curved displays having the same curvature may be disposed to cross one another with respect to the semi-transmissive mirror 100 so as to allow at least one curved virtual image and at least one curved real image to be connected to each other while maintaining a constant curvature.

Figure 7:
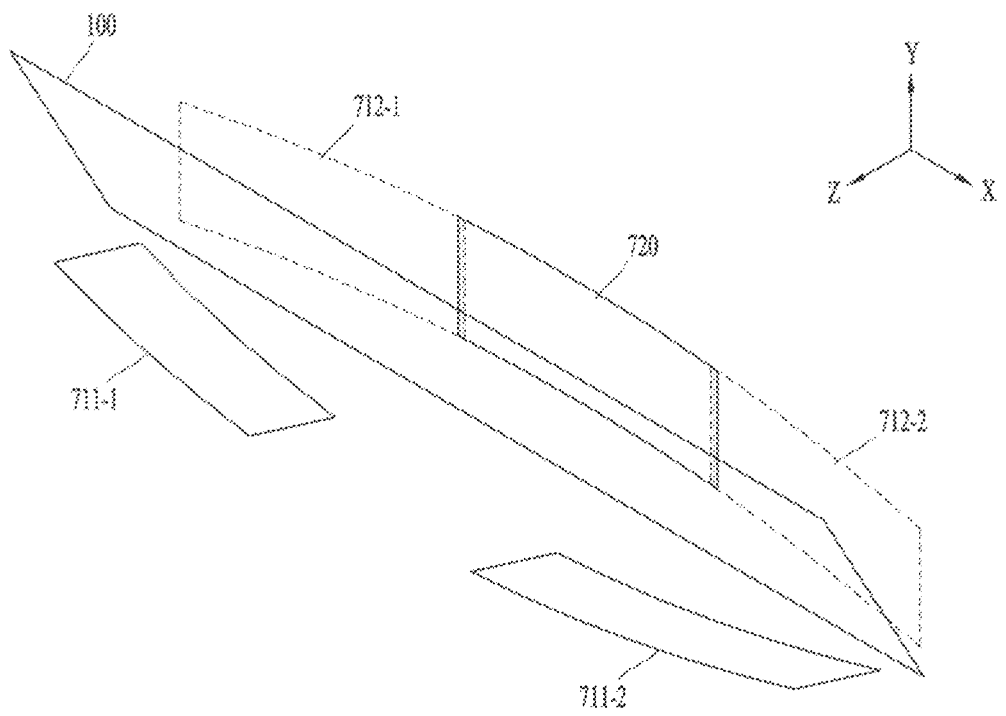
FIG. 7 is a perspective view of a display structure including a plurality of curved displays according to a third embodiment of the present disclosure.

FIG. 7 is a perspective view of a display structure configured with a plurality of curved displays according to the third embodiment of the present disclosure, wherein two first curved displays 711-1, 711-2 are disposed at a lower side of the driver's gaze direction 200 to generate two curved virtual images 712-1, 712-2, and one second curved display is disposed in a direction facing the driver's gaze direction 200 to generate one curved real image 720.

In this case, on the X-axis, the one second curved display may be disposed between the two first curved displays 711-1, 711-2. In addition, left and right edge areas on the X-axis of the curved real image 720 formed from the second curved display may be disposed to overlap with a right edge area of the first curved virtual image 712-1 formed from the first-1 curved display 711-1 and a left edge area of the second curved virtual image 712-2 formed from the first-2 curved display 711-2.

In addition, the first and second curved virtual images 712-1, 712-2 connected to the left and right of the curved real image 720 may be disposed so as to form the two first curved displays 711-1, 711-2 form a constant curvature according to the center of curvature of the curved real image 720 with the curved real image 720 at the center. Accordingly, as shown in FIG. 7, the two first curved displays 711-1, 711-2 may be disposed at a lower side of the driver's gaze direction 200 such that a portion closer to the curved real image 720 is farther away from the semi-transmissive mirror 100, and a portion farther away from the curved real image 720 is closer to the semi-transmissive mirror 100.

Accordingly, the two curved virtual images 712-1, 712-2 and the curved real image 720 disposed between the two curved virtual images 712-1, 712-2 to connect the two curved virtual images 712-1, 712-2 may generate an integrated display area of a curved shape that forms a constant curvature based on the same center of curvature.

Figure 8:
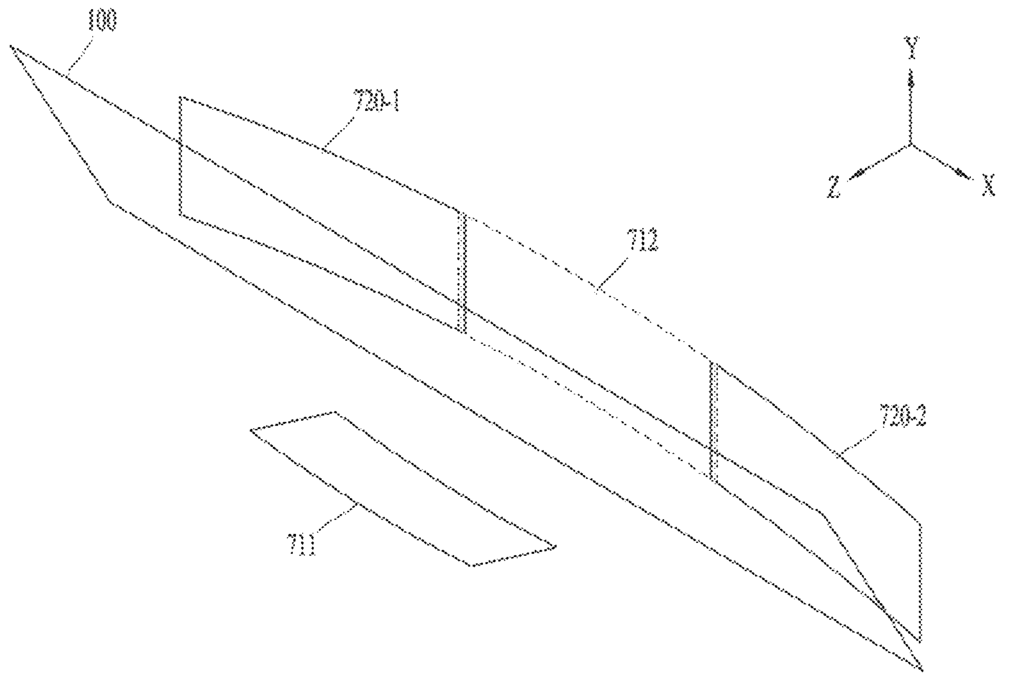
FIG. 8 is a perspective view of another display structure including a plurality of curved displays according to a third embodiment of the present disclosure.

Meanwhile, FIG. 8 is a perspective view of another display structure configured with a plurality of curved displays according to the third embodiment of the present disclosure, wherein one first curved display 711 is disposed at a lower side of the driver's gaze direction 200 to generate one curved virtual image 712, and two second curved displays are disposed in a direction facing the driver's gaze direction 200 to generate two curved real images 720-1, 720-2.

In this case, on the X-axis, the one first curved display 711 may be disposed between the two second curved displays. In addition, the left and right edge areas on the X-axis of the curved virtual image 712 formed from the first curved display 711 may be disposed to overlap with the right edge area of the first curved real image 720-1 and the left edge area of the second curved real image 720-2, respectively.

Additionally, the two curved surfaces 720-1, 720-2 may be disposed to form a constant curvature along the same center of curvature. Furthermore, the first curved display 711 may be disposed at a position spaced apart by a predetermined distance from the semi-transmissive mirror 100 according to a distance on the Z-axis so as to form the curved virtual image 712 according to the common center of curvature of the two curved real images 720-1, 720-2. Accordingly, the two curved real images 720-1, 720-2 and the curved virtual image 712 disposed between the two curved real images 720-1, 720-2 to connect the two curved real images 720-1, 720-2 may generate an integrated display area of a curved shape that forms a constant curvature based on the same center of curvature.

Meanwhile, in the foregoing description, in order to prevent the first display 101 from blocking the semi-transmissive mirror 100, it has been described an example on the assumption that the first display 101 is disposed at a lower side with respect to the gaze direction 200. However, on the contrary, the first display 101 may be disposed in a different manner. As an example, the first display 101 may be disposed above the gaze direction 200, that is, at a top of a cluster.

Figure 9:
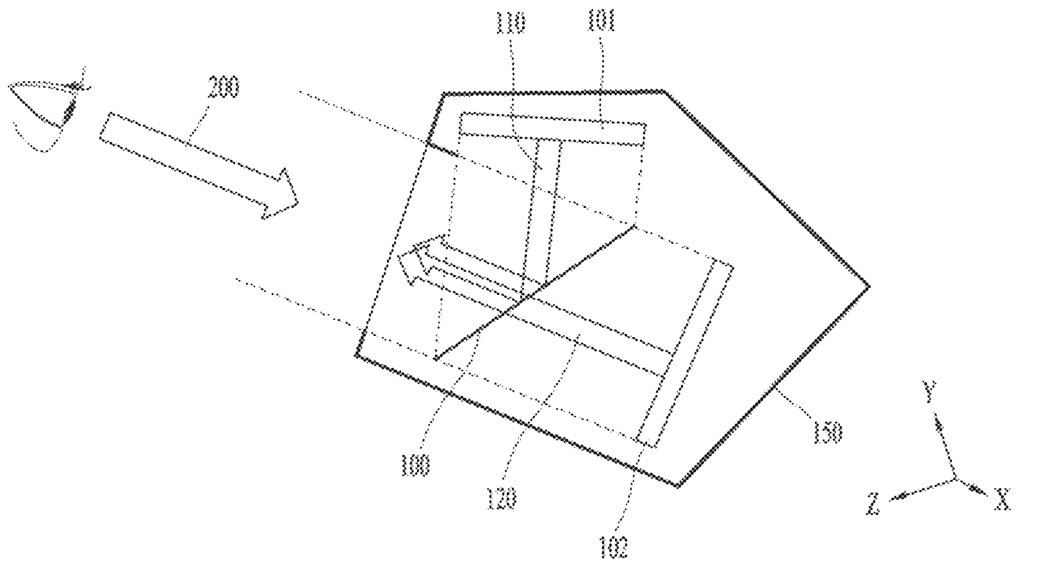
FIG. 9 is an exemplary diagram showing an example in which a first display is disposed at a top of a cluster in a display structure according to an embodiment of the present disclosure.

FIG. 9 is an exemplary diagram showing an example in which the first display 101 is disposed at a top of a cluster in such a display structure according to an embodiment of the present disclosure.

As described above, the first display 101 may form a virtual image connected to a real image to implement an integrated display area. Furthermore, the virtual image may be formed by being reflected from a front surface of the semi-transmissive mirror 100. Therefore, when the first display 101 is disposed at a top of the cluster, that is, at an upper side of the gaze direction 200, as shown in FIG. 9, the semi-transmissive mirror 100 may also be disposed to be inclined at a predetermined angle in a direction in which the first display 101 is disposed.

Thus, as shown in FIG. 9, when the first display 101 is disposed at an upper side with respect to the gaze direction 200, the semi-transmissive mirror 100 may be disposed to be inclined so as to allow a front surface thereof to be tilted in the direction in which the first display 101 is disposed. Accordingly, as shown in FIG. 9, when the first display 101 is disposed at an upper side of the gaze direction 200, the semi-transmissive mirror 100 may be disposed to be inclined in a direction opposite to an inclination angle as shown in FIG. 1.

In this case, since the first display 101 is not accommodated at a bottom of a cluster area, a volume at the bottom of the cluster may be further reduced as shown in FIG. 9. Accordingly, even when there is insufficient space to accommodate the first display 101 at the bottom of the cluster due to the handle, operating part, or the like, an integrated display area extended in the X-axis according to an embodiment of the present disclosure may be generated through the modified structure of the present disclosure as shown above in FIG. 9. The above detailed description is therefore to be construed in all aspects as illustrative and not restrictive. The scope of the disclosure should be determined by reasonable interpretation of the appended claims and all changes that come within the equivalent scope of the disclosure are included in the scope of the disclosure.

The invention claimed is:

1. A display device equipped in a vehicle and communicating with at least one processor equipped in the vehicle, the display device comprising:

a first display outputting first light forming first visual information;

a second display outputting second light forming second visual information; and a semi-transmissive mirror having a front surface reflecting the first light and a rear surface transmitting the second light, wherein a first edge area of reflected light reflected by the semi-transmissive mirror and a second edge area of transmitted light transmitted by the semi-transmissive mirror overlap each other to form an overlapping area, so that a non-overlapping area of the reflected light and the non-overlapping area of the transmitted light are synthesized into one area through the overlapping area to create one display area that is seamlessly connected in one direction.

2. The display device of claim 1, further comprising:

a housing accommodating the semi-transmissive mirror, the first display, and the second display, the housing having an opening surface that faces the semi-transmissive mirror from a driver's eye height on one surface thereof, wherein the first display is disposed at a front surface side of the semi-transmissive mirror to output an image reflected on a front surface of the semi-transmissive mirror, and is disposed at an upper or lower side of an opening direction of the opening surface, wherein the second display is disposed on a rear surface side of the semi-transmissive mirror to output an image transmitted through a rear surface of the semi-transmissive mirror, and is disposed to face the opening direction, and wherein the semi-transmissive mirror is disposed to be inclined at a predetermined angle in a direction in which the first display is disposed with respect to the opening direction, and wherein the first display and the second display are disposed so that the first display and the second display are intersecting with the semi semi-transmissive mirror as the center, and are disposed so that a real image and a virtual image are aligned along an axis formed with the semi-transmissive mirror as the center.

3. The display device of claim 2, wherein the first display and the second display are a plurality of curved displays having a same curvature, and are disposed to cross alternately at front and rear surface sides of the semi-transmissive mirror on one axis formed with respect to the semi-transmissive mirror so as to allow curved virtual and real images formed by being reflected or transmitted by the semi-transmissive mirror to have a same center of curvature.

4. The display device of claim 3, wherein the first display comprises two first curved displays disposed at a front surface side of the semi-transmissive mirror and at an upper or lower side of the opening direction of the opening surface, wherein the second curved display is disposed at a rear surface side of the semi-transmissive mirror to face the opening direction, and wherein the two first curved displays are disposed such that a portion closer to the curved real image formed from the second curved display is disposed farther away from the semi-transmissive mirror, and a portion farther away from the curved real image is closer to the semi-transmissive mirror.

5. The display device of claim 3, wherein the second display comprises two second curved displays disposed at a rear surface side of the semi-transmissive mirror to face the opening direction, wherein the first curved display is disposed at a front surface side of the semi-transmissive mirror and at an upper or lower side of the opening direction of the opening surface, wherein the two second curved displays are disposed so as to have the same center of curvature, and wherein the first curved display is disposed at a position spaced apart by a predetermined distance from the semi-transmissive mirror so as to form a curved virtual image along the center of curvature.

6. The display device of claim 3, wherein the housing is at least part of an internal frame of a vehicle constituting at least one of a front of a driver seat and a front of a passenger seat of the vehicle.

7. The display device of claim 1, wherein the first display is disposed to be spaced apart by a predetermined distance from a front surface of the semi-transmissive mirror so as to allow a virtual image to be formed at a distance equal to a distance between a real image and the rear surface of the semi-transmissive mirror, and wherein the real image and the virtual image are spaced apart by the same distance from the rear surface of the semi-transmissive mirror.

8. The display device of claim 7, wherein the overlapping area and the non-overlapping area are synthesized into a single image using an edge blending technique, including the overlapping area and non-overlapping areas on both sides of the overlapping area.

9. The display device of claim 2, wherein the first display is disposed at a lower side of the opening direction of the opening surface, and disposed to be inclined at a preset angle with respect to the opening direction.

10. The display device of claim 1, wherein a light transmittance of the semi-transmissive mirror is adjusted so as to allow a brightness of a virtual image and a brightness of a real image to be the same.

11. The display device of claim 10, wherein the semi-transmissive mirror has a titanium-deposited polarizing reflective layer.

12. The display device of claim 1, wherein the first display comprises two first displays disposed at a front surface side of the semi-transmissive mirror and at an upper or lower side of the opening direction of the opening surface, and the second display is disposed at a rear surface side of the semi-transmissive mirror to face the opening direction, and wherein the two first displays are a driver seat display disposed in front of a driver seat and a passenger display disposed in front of a passenger seat, respectively.

13. The display device of claim 1, wherein the second display comprises two second displays disposed at a rear surface side of the semi-transmissive mirror to face the opening direction, wherein the first display is disposed at a front surface side of the semi-transmissive mirror and at an upper or lower side of the opening direction of the opening surface, and wherein the two second displays are a driver seat display disposed in front of a driver seat and a passenger display disposed in front of a passenger seat, respectively.

14. The display device of claim 1, wherein the first display is disposed at a front surface side of the semi-transmissive mirror and at an upper or lower side of the opening direction of the opening surface, wherein the second display disposed at a rear surface side of the semi-transmissive mirror to face the opening direction, wherein one of the first display and the second display is a driver seat display disposed in front of a driver seat, and wherein another of the first display and the second display is a passenger seat display disposed in front of a passenger seat.

15. The display device of claim 1, wherein the first display outputs a left-right reversed image.

* * * * *